United States Patent [19]

Crippen et al.

[11] 3,871,985

[45] Mar. 18, 1975

[54] LUGGIN TIP BLOCK ASSEMBLY AND USE IN ELECTROLYTIC CELLS

[75] Inventors: Monte D. Crippen; Bernardus J. Mentz, both of North Vancouver, British Columbia, Canada

[73] Assignee: Hooker Chemical & Plastics Corp., Niagara Falls, N.Y.

[22] Filed: June 25, 1973

[21] Appl. No.: 373,215

[52] U.S. Cl.............. 204/231, 204/195 R, 204/252, 204/280
[51] Int. Cl...... G01n 27/30, B01k 3/02, C23b 5/72
[58] Field of Search............ 204/231, 195, 1 T, 252, 204/280

[56] References Cited

UNITED STATES PATENTS

| | | | |
|---|---|---|---|
| 3,607,700 | 9/1971 | Tosteson | 204/195 M |
| 3,696,017 | 10/1972 | Wallen | 204/195 R |

Primary Examiner—G. L. Kaplan
Attorney, Agent, or Firm—Peter F. Casella; Donald C. Studley

[57] ABSTRACT

Disclosed herein is an improved apparatus for containing a Luggin Tubulus whereby the half-cell voltage at a particular point at or near an operating electrode of an electrochemical cell may be reliably and accurately determined.

6 Claims, 4 Drawing Figures

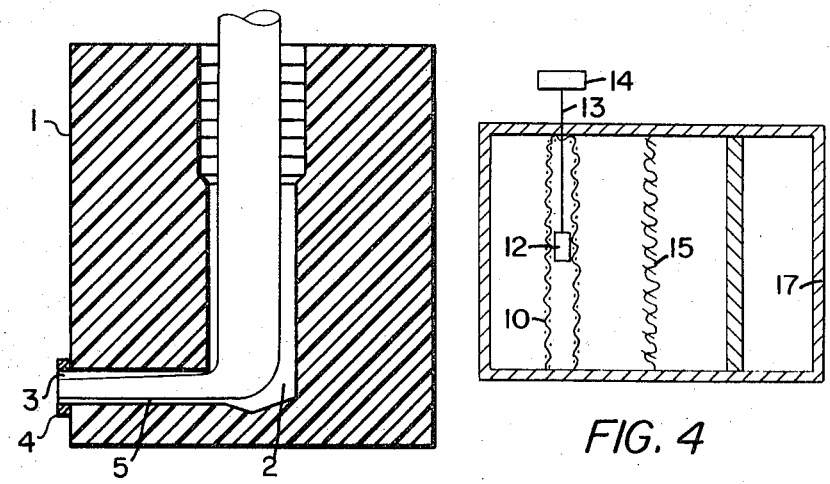
FIG. 1
FIG. 4
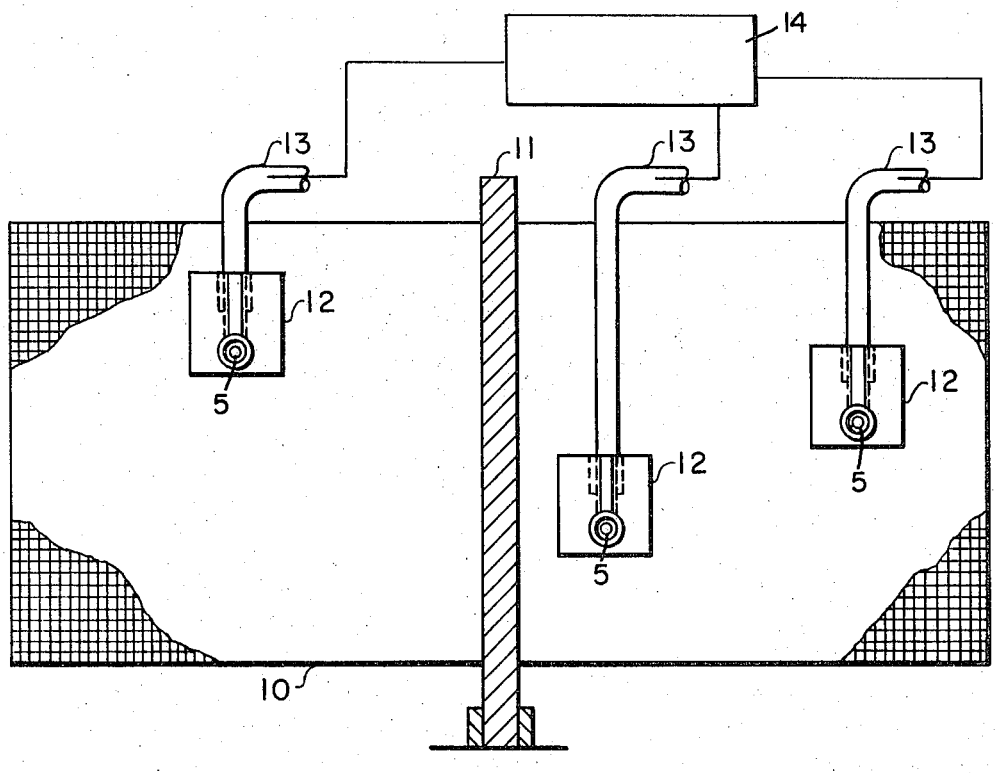
FIG. 2

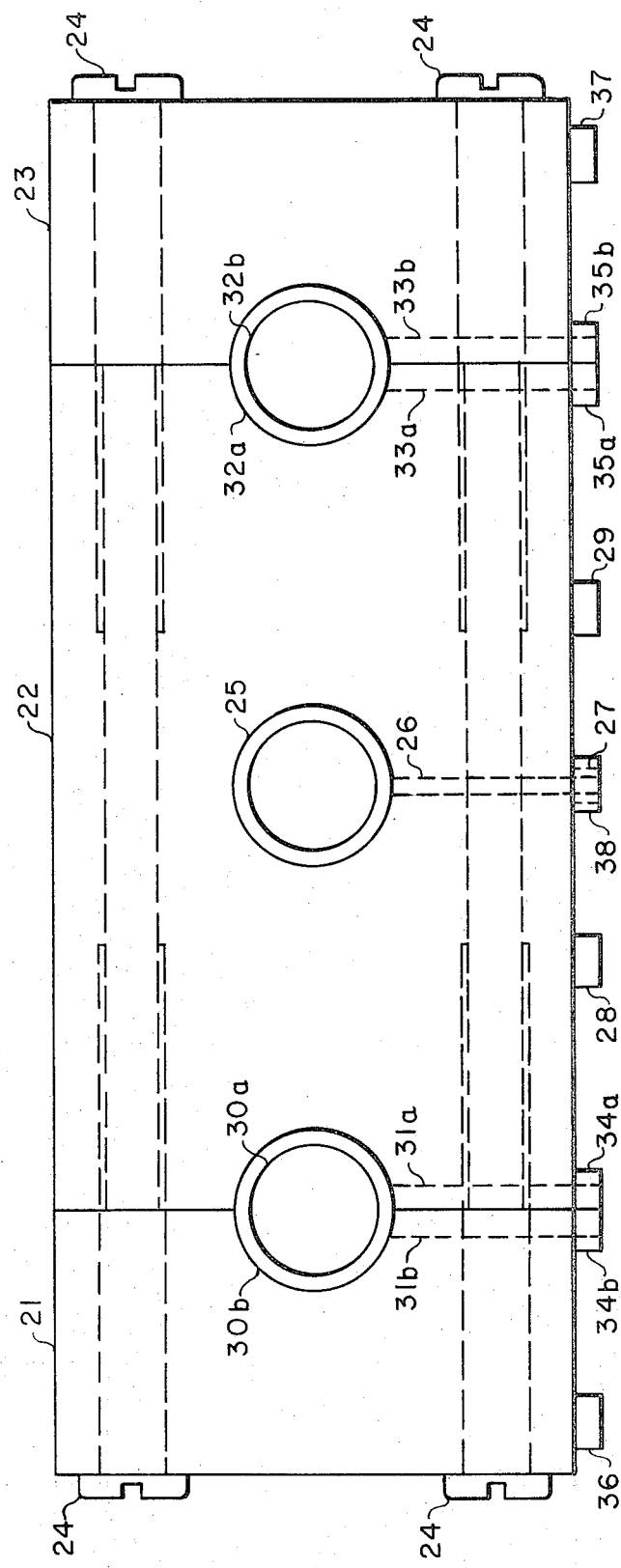

LUGGIN TIP BLOCK ASSEMBLY AND USE IN ELECTROLYTIC CELLS

FIELD OF INVENTION

This invention relates to electrochemical cells and more particularly to improvements in the apparatus for, and the method of determining half voltages of the electrodes of said cells during the operation thereof.

BRIEF DESCRIPTION OF THE PRIOR ART

It is often desirable to measure the potential of a cathode or an anode across which are appreciable current is passing so that no part of the ohmic or IR potential drop within the electrolyte is included in the measurement. For example, in the electrolysis of brine in a conventional diaphragm cell, the efficiency of the operating electrodes is measured periodically by placing a probe of small diameter in close proximity to the surface of the electrode and measuring the potential or half-cell voltage at this point or area of the electrode, by means of suitable potentiometer located outside of the cell. This device was first suggested by Luggin, and hence is generally known as a "Luggin Tubulus," and consists essentially of a hollow tube containing an electrolyte establishes a fluid electrolytic connection with the potentiometer.

Thus, this device extends the reference electrode electrolyte (in which practically no current flows) up to the surface of the electrode being monitored. Only the amount of IR drop occurring in the electrolyte at the extreme end ("tip") of the tubulus adjacent to the electrode is then included in the potential measurement. Similar measurements may be taken at several points (or areas) along the electrode in order that variations along the electrode surface, which is large with respect to the area of the tip of the tubulus, can be determined.

A major problem which has been encountered with the use of such Luggin Tubulus, is in placement of the device at the proper point and the securing of the tip of the device while the voltage readings are being taken.

BRIEF DESCRIPTION OF THE INVENTION

The present invention provides an improved apparatus for, and method of determining the half-cell voltages of electrodes of an electrochemical cell during the operation thereof. The apparatus comprises a nonmetallic block having therein at least one channel adapted to receive a Luggin Tubulus therein, said tubulus or tube being open at one end in communication with the electrolyte in the electrode compartment and the other end being provided with means communicating with a poteentiometer at a potentiometer outside of the electrolytic cell.

This block is capable of being placed securely on or between the electrode and remains in the same position between the tip of the Luggin tube held therein and the electrode throughout its use. When used to monitor a conventional screen anode, it fits snugly between the anode screens and requires no special tools to emplace it or secure it in use. Standard fittings and tubing can be used to complete the circuit to the reference electrode outside the cell. By these means, more accurate and consistent data relevant to the operating characteristics of the electrolysis cell can be ascertained.

BRIEF DESCRIPTION OF THE DRAWINGS

FIG. 1 is a shematic illustration of a Luggin Tip block constructed in accordance with one embodiment of the invention.

FIG. 2 is a schematic illustration of a conventional screen anode having therein three of the Luggin Tip Blocks of this invention emplaced therein.

FIG. 3 is a top plan view of a multi-purpose Luggin Tip Block of this invention.

FIG. 4 is a schematic illustration of an electrolytic cell having an anode in which is employed a Luggin Tip Block of the invention.

DETAILED DESCRIPTION OF PREFERRED EMBODIMENTS OF THE INVENTION

This invention provides a novel apparatus, hereinafter referred to as a "Luggin Tip Block," which enables one to accurately and reliably measure the half cell voltage at a particular point at or near an operating electrode, particularly an anode, of an electrochemical cell, and to the process of determining said half cell voltage.

This novel apparatus will be described in a specific embodiment of this invention, with reference to FIG. 1 of the drawings included herewith as a part of this specification.

As shown schematically in FIG. 1, the Luggin Tip Block comprises a block, 1, of material resistant to the environment in which it is to be used, e.g., a concentrated brine anolyte liquor, such as polypropylene, Teflon, and the like plastic materials said block having therein a first channel, 2, extending vertically through the major portion of the block, and communicating at a point in the lower portion of said channel with a second channel, 3, preferably of smaller bore than said first channel, said second channel extending horizontally through said block to a point in a side wall of said block. Said second channel is open at both ends extending through the said side wall of the block and terminates at collar, 4, thereby establishing communication between the electrolyte liquor of the cell and the first channel. Said first channel is adapted at the upper end thereof to receive means for communicating said first channel with a potentiometer means, not shown, located outside of the electrolytic cell. Collar, 4, extends from the outer surface of said block, preferably such that when in place on the anode screen, the outer surface of the collar is flush with the outer surface of the anode screen.

Said first channel, 2, and said second channel, 3, are adapted to receive a tube, the Luggin Tubulus 5, which can be filled with electrolyte from a reservoir, not shown, outside of the cell. The Luggin Tubulus 5, enclosed in the Luggin Tip Block of this invention permits the determination of the half-cell voltage at the point at or near the electrode adjacent to the Luggin Tip, with little or no inaccuracy introduced by the potential drop arising in the cell compartment electrolyte through which the current is flowing. Since the Luggin Tip Block of this invention is designed to remain in the same position between the tip and the electrode, reproducible results will be obtained.

Preferably the Luggin Tip Block is used to contain the Luggin Tubulus and thus to measure the half-cell voltage at the anode. The Block is of such design that it fits snugly between the anode screens of conventional design and requires no special tools to emplace it or special means to secure it in place. The Block can be used with standard fittings and tubing to complete the circuit to the potentiometer and electrolyte reservoir outside of the cell.

For the purpose of determining half-cell voltage of an anode in an operating electrolytic cell, the schematic construction of the anode is shown in FIG. 2 of the drawings attached hereto.

Referring to FIG. 2 of the drawings, shown therein is a conventional screen anode, 10, which includes a solid bar of conductive metal, 11, for attachment of the anode to the base of the cell, not shown. The anode screen is of substantially rectangular shape having a hollow space section through which the bar, 11, extends. Shown thereon, are three Luggin Tip Blocks, 12, randomly placed within the hollow space formed by the rectangular screen section of the anode and held securely in place by the screen section. Each of the blocks contains a Luggin Tubulus 5 which is connected by tubing means, 13, to the potentiometer and electrolyte reservoir, shown schematically as 14, located outside of the cell. The potentiometer is such that the half-cell voltage of the anode section adjacent to each of the blocks can be separately determined. The blocks are securely held in place by the anode screen and thus the half cell voltage determined represents a reliable value of the operating characteristics of anode at the same point or area of the anode throughout the operation of the cell.

The Luggin Tip Block of this invention is fabricated of a non-conductive material such as natural rubber, synthetic polymers such as polyethylene, polypropylene, Teflon, flexible polyurethane and the like materials. Preferably highly resistant polymers are used e.g., Teflon and polypropylene.

As indicated above, the Luggin Tip Block of this invention comprises two channels adapted to receive a Luggin Tubulus through which the reference electrolyte solution passes. Generally and preferably the channels are of different dimensions. Preferably the channels are circular in shape although this is not critical. Conveniently, in a block meauring 1 ⅝ inch by 1 ¼ inch by 1 ⅜ inch, the first channel is about ⅝ inch in diameter and the second channel is about ⅛ inch ±1/32 inch in diameter. The dimensions of the block are not critical but preferably the block should be of such size as to fit snugly with the screen section of the electrode with which it is to be used. The channels may be cylindrical or tapered as desired and convenient.

An alternate and particularly useful modification of the apparatus of this invention is shown in FIG. 3 which is a top plan view of this embodiment.

The Luggin Tip Block of this embodiment consists of three sections, 21, 22, and 23, joined by screw fastening means, 24. The center section, 22, is provided with a first channel, 25, and a second channel, 26, adapted to receive a Luggin Tubulus. Said second channel terminates in the lower portion of said center section at collar 27. Said center section is provided with optional solid circular extensions, 38, 28, and 29, which fit in the anode screen and serve to secure the Luggin Block in place on the anode screen. Said center section, 22, is provided also with a half of first channel member 30a, communicating with a half of second channel member 31a, said half of a second channel member 31a, terminating in the lower portion of said center section at a half of a collar member 34a, said communicating half channel members 30a, 30a, and half collar member 34a, being positioned in the left side wall of said center section. A similar half first channel member 32a, half second channel member 33a, and half collar member 35a, are positioned in the right side wall of said center section.

The left hand section, 21, is provided with half channels 30b, and 31b, and half collar member 34b which together with the said corresponding half channels 30a and 31a and half collar member 34a of said center section form a first and second channels and collar member adapted to receive a Luggin Tubulus. In a similar manner the right hand section, 23, is provided with half channels 32b and 33b and half collar member 35b which together with the said corresponding half channels 32a, and 33a, and half collar member 35a, of said center section form a first channel, second channel and collar member adapted to receive a Luggin Tubulus.

Said left section 21, center section 22, and right section, 23, are provided with fastener receiving means adapted to receive and contain fastener means 24 to hold the several sections rigidly together. Said left section 21 and right section, 23, are optionally provided also with circular extensions, 36 and 37, which fit in the anode screen and serve, together with optional extensions, 38, 28 and 29, to secure the Luggin Tip Block in place on the anode screen.

This multi-section Luggin Tip Block is selected for reasons of economy. It is apparent that the equivalent may be provided by forming the apparatus from a single block of material and forming the channels by boring several apertures in the single block. Alternatively the three sections may be formed from solid material and the channels bored therein, one in each section. However, it is more economical to mold the sections having the half channels therein and to complete the unit by boring only one set of channels in the center section.

Although in FIG. 3, only two fastener means, 24, are shown, it is preferred that at least three such means be provided, one in each of the three corners. The fourth corner is not utilized since the fastening means would interfere with the channel members which occupy the area through which this fourth fastener means would traverse in its path through the block. Other fastener means, e.g., tongue and groove means, plate fasteners on the top and bottom of the block could be used also, as will be obvious to those skilled in the art.

Similarly, the number of the extensions, which are optionally placed on the face of the block and serve to hold the block in place on the anode screen, may be varied as desired. As shown in FIG. 3, one such extension is located in the end sections, 21, and 23, while the center section bears three extensions. Additional extensions may be provided in each of the sections to provide the desired degree of security of the block within the anode screen section.

As is shown in FIG. 4, there is an electrolytic cell having a housing 17. Disposed within the housing is a screen mesh anode 10, a cathode 16 and a porous diaphragm 15, separating the anode and cathode. A Luggin Tip Block 12 is disposed within the mesh anode 10 and connected by means of line 13 to the potential measuring apparatus 14 located outside of the cell.

When in place in the electrolytic cell, the Luggin Tip Block, described in FIG. 3, is inserted within the anode screen and is held in place by frictional contact with the anode screen and by the several extensions on the side of the block which fit in the interstices of the anode screen. A Luggin Tubulus is inserted in each of the three channel members of the block and the tip may terminate at the opening of the collar members and thereby provide a means of determining the half-cell voltage at three points along the anode. Alternatively the tip of one Luggin Tubulus may terminate at the collar member, one Tubulus member may extend through the collar member and terminate at the diaphragm member and the third may extend through the diaphragm into the cathode section. In such an alternative, positioning the half-cell voltages at the anode, diaphragm and cathode may be monitored.

The Luggin Tip Block of this invention has been described in particular with reference to its use with a foraminous metal or screen type electrode. The blocks can also be used with solid or plate type electrodes. In such instances, the solid or plate type electrodes are adapted to receive and hold in place the Luggin Tip Block of this invention by the simple expedient of providing apertures in the electrodes suitabale for receiving and holding in place therein the Luggin Tip Blocks.

The following example will illustrate the method of the present invention.

EXAMPLE

A conventional two compartment brine electrolysis cell equipped with platinum and ruthenium oxide, coated titanium anode and a ferrous metal screen cathode, separated by a porous asbestos diaphragm in which three Luggin Tip Blocks of the present invention were snugly placed in the hollow section of the anode. Each of the blocks contained a Luggin Tubulus which was connected by rubber tubing to a calomel hydrogen electrode located out of the cell and the Tubulus was filled with brine solution from a brine reservoir. The electrolysis was strated and after the reaction had reached an equilibrium the half-cell voltage of the anode at the points adjacent to each of the Luggin Tips was measured. The cell was operated for about 21 days thereafter and the half-cell voltages were again measured.

The data collected is recorded in the following Table.

TABLE

| Block | Initial Reading | Reading After 21 Days |
|---|---|---|
| A | 1.35 volts | 1.33 volts |
| B | 1.31 volts | 1.33 volts |
| C | 1.29 volts | 1.32 volts |
| Cell Voltage | 3.92 | 3.99 |
| Cell Load | 68.0 KA | 76.3 KA |

The differences between the two sets of data in the half-cell voltages taken during this 21 day period are consistent with the theoretical expectations of the anode. The consistency of the readings indicates that the process of this invention and the novel Luggin Tip Blocks provide a reliable method of determining half-cell voltages of operating anodes.

This invention has been described and illustrated by means of certain preferred embodiments. As will be apparent to those skilled in this art, variations in the disclosure herein can be made without departing from the scope or spirit of the invention.

We claim:

1. Apparatus for use in the determination of half-cell voltages of operating electrodes which apparatus consists essentially of a block of non-conductive material having at least one passageway therein, which passageway consists essentially of a first channel and a second channel, said first channel, at one end extending through one wall of said block and, at the opposite end, terminating within said block in communication with one end of said second channel, said second channel being disposed at a substantially right angle to said first channel, one end of said second channel being in communication with the end of said first channel which terminates within said block and the opposite end of said second channel extending through a wall of said block and terminating in a collar which surrounds the said end of the channel and projects beyond the surface of the said wall of the block, a Luggin Tubulus disposed in said first and second channels, said Tubulus conforming substantially to the dimensions and configurations of said channels, the tip of said Tubulus terminating at the outer surface of said collar and the opposite end of said Tubulus extending beyond the wall of said block through which said first channel extends and being connected to potentiometric means for measuring electrical potential differences.

2. An electrode of an electrochemical cell having secured thereto at least one apparatus as described in claim 1.

3. An electrode as described in claim 2 wherein said electrode is an anode.

4. The electrode as described in claim 3 wherein said anode is a screen anode and said apparatus is secured between the anode screens.

5. An electrochemical cell comprising a housing, a cathode, an anode and a porous diaphragm separating said cathode and said anode, said anode having secured thereto at least one apparatus as described in claim 1.

6. An electrochemical cell as described in claim 5 wherein said anode is a screen anode and said apparatus is secured between the anode screens.

* * * * *